E. E. BLACK.
PNEUMATIC TIRE FOR VEHICLE WHEELS.
APPLICATION FILED MAR. 4, 1911.

1,023,454.

Patented Apr. 16, 1912.

Witnesses
J. Otto Baenziger
V. C. Spratt

Inventor
Elery E. Black
By Parker & Burton Attorneys

UNITED STATES PATENT OFFICE.

ELERY EMMERSON BLACK, OF DETROIT, MICHIGAN.

PNEUMATIC TIRE FOR VEHICLE-WHEELS.

1,023,454.  Specification of Letters Patent. Patented Apr. 16, 1912.

Application filed March 4, 1911. Serial No. 612,243.

*To all whom it may concern:*

Be it known that I, ELERY EMMERSON BLACK, a citizen of the United States, residing at Detroit, county of Wayne, State of Michigan, have invented a certain new and useful Improvement in Pneumatic Tires for Vehicle-Wheels, and declare the following to be a full, clear, and exact description of the same, such as will enable others skilled in the art to which it pertains to make and use the same, reference being had to the accompanying drawings, which form a part of this specification.

This invention relates to pneumatic tires for vehicle wheels.

It has for its object an improved pneumatic tire, comprising an outer member of a flexible nature and inner members of more inflexible character coupled by air-tight joints to produce a cheap, durable and efficient pneumatic tired wheel.

Figure 1:
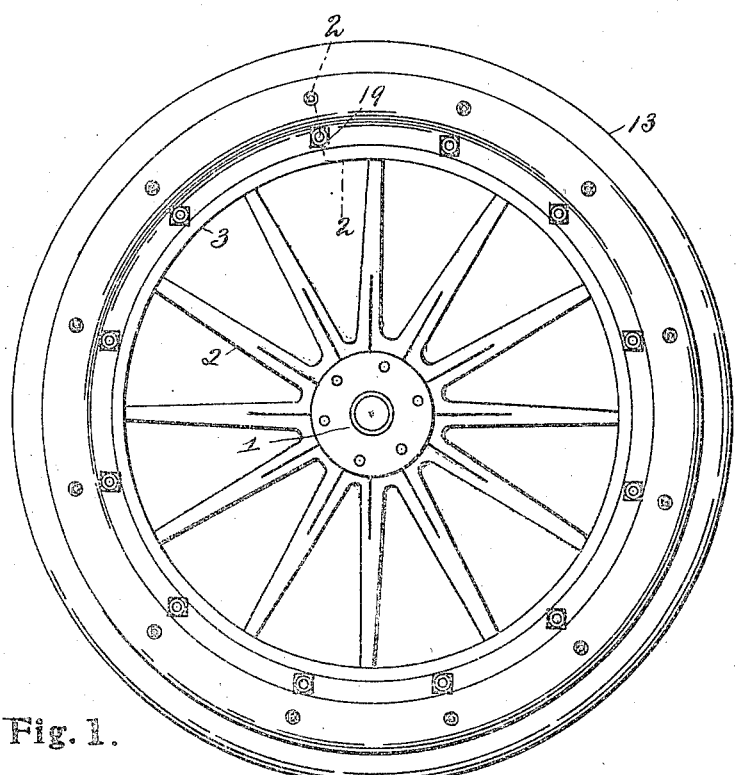
Figure 2:
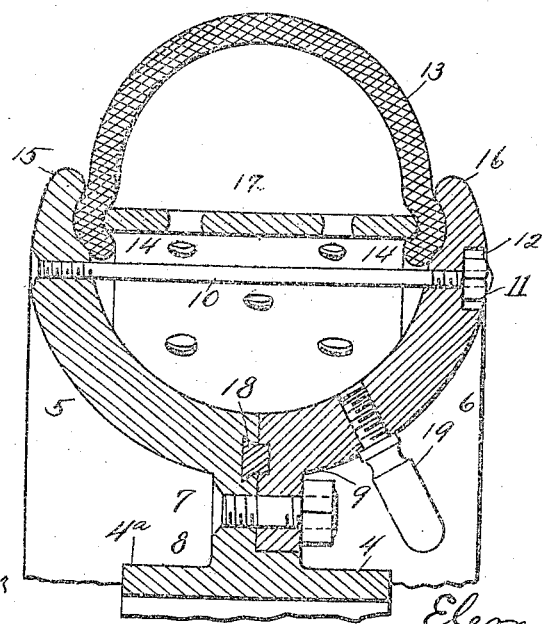

In the drawings:—Figure 1, is a side elevation of the entire wheel. Fig. 2, is a cross section at the line 2—2 of Fig. 1.

The spokes 2 of the wheel extending from the hub 1, sustain the felly 3, upon which rests a rim 4 that forms part of the pneumatic tire. The rim 4 is provided with a foot ring 4ª extending with a broad flange 5 on the one side, and having secured to it a broad flange 6 on the opposite side; the two flanges 5 and 6, annular in their general character, are held together by bolts 7 through the connecting web 8 between the foot ring 4ª and the flange 5, and through the corresponding ring coupling 9 on the flange 6. They are also secured by bolts 10 near the outer periphery of the flanges. The bolts 10 are preferably inserted by screw threads into the flange 5, the screw head riveted down and the screw thread soldered in order to provide a strong and air-tight joint. The end of the bolt 10 projects through the member 6 and a holding cap nut 11 is run on to the end of it with a packing 12 inserted under the nut 11, making an air-tight connection at this point. A tread member or tire 13 of flexible material provided with beads 14 engages in grooves 15 and 16 in the flanges 5 and 6 and is held tightly in engagement with the flanges 5 and 6 in said grooves by a loose ring 17 that engages inside the flexible tread member or tire 13, and makes a close and air-tight joint between the flexible tread member or tire and flanges 5 and 6. Packing 18 is inserted in a dovetailed groove in the web 8 and projects into a groove in the ring coupling 9 of the flange 6, making an air-tight joint at this point.

The tire is inflated through the air nozzle 19, distending the flexible tread member or tire 13 and furnishing a suitable resilient tread for the wheel.

What I claim is:—

1. A pneumatic tire having in combination, a rim having an upwardly projecting flange, a second flange bolted to said first mentioned flange through the two neck projections of the flanges, the said flanges being shaped to form an annularly channeled rim and each flange having on its inner surface a groove, bolts passed through the flanges near their free ends and adapted to securely brace the same, a flexible tread member seated in said annularly channeled rim and a ring contained within the flexible member of the channeled rim, adapted to press the flexible tread member into air-tight engagement with the said grooves of the flanges, the said channeled rim adapted to form the inner part of and the said flexible tread member adapted to form the outer part of the air containing chamber, substantially as described.

2. A pneumatic tire, having its air chamber formed in part by a channeled rim in two parts separately connected and provided with oppositely disposed seating grooves for a flexible tread member, a flexible tread member engaging along its edges in said seating grooves, a perforated included ring engaging along the edges of said flexible tread member and forcing said flexible tread member into said grooves, and tie bolts located near the edges of the said channeled rim and extending across the same to draw the rim members, the ring and the tread into close engagement.

In testimony whereof, I sign this specification in the presence of two witnesses.

ELERY EMMERSON BLACK.

Witnesses:
 CHARLES F. BURTON,
 LOTTA LEE BRAY.

Copies of this patent may be obtained for five cents each, by addressing the "Commissioner of Patents, Washington, D. C."